(12) United States Patent  
Kim

(10) Patent No.: US 9,081,544 B2  
(45) Date of Patent: Jul. 14, 2015

(54) CRADLE FOR PORTABLE TERMINAL

(71) Applicant: Samsung Electronics Co., Ltd., Gyeonggi-do (KR)

(72) Inventor: Won-Tae Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 250 days.

(21) Appl. No.: 13/647,613

(22) Filed: Oct. 9, 2012

(65) Prior Publication Data

US 2013/0088826 A1    Apr. 11, 2013

(30) Foreign Application Priority Data

Oct. 10, 2011   (KR) .......................... 10-2011-0102803

(51) Int. Cl.
*G06F 1/16* (2006.01)
*G06F 13/00* (2006.01)

(52) U.S. Cl.
CPC ............ *G06F 1/1632* (2013.01); *G06F 1/1669* (2013.01)

(58) Field of Classification Search
CPC .................................................. G06F 1/1632

USPC ............ 361/679.01–679.45, 679.55–679.59; 710/303, 304

See application file for complete search history.

(56) References Cited

U.S. PATENT DOCUMENTS

| | | | |
|---|---|---|---|
| 6,538,642 B2 * | 3/2003 | Tsai .............................. | 345/168 |
| 6,700,775 B1 * | 3/2004 | Chuang et al. ........... | 361/679.01 |
| 6,940,713 B2 * | 9/2005 | Huang et al. ............. | 361/679.09 |
| 6,986,492 B2 * | 1/2006 | Huang et al. ............. | 248/346.03 |
| 7,567,432 B1 * | 7/2009 | Tabasso et al. .......... | 361/679.09 |
| 7,983,035 B1 * | 7/2011 | Ting ......................... | 361/679.41 |
| 8,665,589 B2 * | 3/2014 | Lin ........................... | 361/679.41 |
| 2005/0139740 A1 * | 6/2005 | Chen et al. ................. | 248/286.1 |

* cited by examiner

*Primary Examiner* — Nidhi Thaker

(74) *Attorney, Agent, or Firm* — Cha & Reiter, LLC.

(57) ABSTRACT

A cradle for a portable terminal includes a cradle body, cradle grooves extending from a surface of the cradle body in parallel with each other, and a support plate able to emerge by a pivoting action from the surface of the cradle body that is between the cradle grooves. When the portable terminal is cradled, the support plate emerges from the surface of the cradle body to support the surface of the portable terminal, and one of the cradle grooves is selectively used to support a portion of an edge of the portable terminal so as to provide a selected facing direction for the portable terminal.

17 Claims, 13 Drawing Sheets

CRADLE FOR PORTABLE TERMINAL

CLAIM OF PRIORITY

Pursuant to 35 U.S.C. §119(a), this application claims the benefit the earlier filing date of a Korean Patent Application filed in the Korean Intellectual Property Office on Oct. 10, 2011 and assigned Serial No. 10-2011-0102803, the entire disclosure of which is hereby incorporated by reference.

BACKGROUND OF THE INVENTION

1. Field of the Invention

The present invention generally relates to a portable terminal, and more particularly, to a cradle used to support the portable terminal on a flat plane such as a table, etc.

2. Description of the Related Art

Generally, a portable terminal refers to an apparatus which, while carried by a user, provides a function of communication with another user or a base station. With the development of mobile communication technologies and information communication industry, the services being provided by the portable terminal has been rapidly expanded. For example, initial mobile communication services, which have been limited to partner call, voice communication, short message transmission, etc., are now expanding to providing a moving image service, ring tones, games, mobile banking, and so forth, and are now in popular use by many, from young people to old people.

Recently, multimedia services provided through portable terminals have been improved, and now portable terminals which are in common use today come close to providing the performance of a Personal Computer (PC) of a general concept, such as a smart phone or a tablet PC. Therefore, users are provided with an environment in which they, while on the move, can enjoy the Internet or moving images (that is, video playback) and even conduct business by using a smart phone or a tablet PC. The smart phone or the tablet PC, because of their small size, includes a display device using a touch screen instead of using a keyboard consisting of physical switches to improve portability and usuability, that is, to provide a miniaturized, but extended display device. The touch screen implements the keyboard on the screen, such that a user can activate and use a keyboard function only when necessary.

Meanwhile, it is known that the portable terminal can extend its functions by using a cradle which is commonly called a docking station. For example, a portable terminal coupled to a cradle having a speaker phone embedded therein may be used as audio equipment such as an audio system, and may also be used as a video player when coupled to video equipment such as a TV receiver or a projector. In addition, when coupled to a cradle having a keyboard installed therein, a portable terminal can be used as a laptop computer. A typical cradle of a portable terminal has been limited to a charging function, but now, it is used as an additional device for using diversified functions of the portable terminal.

However, the typical cradle of the portable terminal maintains an exterior for cradling the portable terminal, making it difficult to carry the cradle with the portable terminal. Additionally, the typical cradle has a limited functionality with respect to a display direction for the portable terminal.

SUMMARY OF THE INVENTION

Accordingly, an aspect of the present invention is to provide a cradle which is easy to carry with a portable terminal.

Another aspect of the present invention is to provide a cradle which is useful for extending an input device of a portable terminal as well as provides a simple cradling function.

Further, another aspect of the present invention is to provide a cradle whose simple cradling function and input device extending function can be selected and used by a user.

According to an aspect of the present invention, there is provided a cradle for a portable terminal. The cradle includes a cradle body, cradle grooves formed on a surface of the cradle body and extending in parallel with each other, and a support plate which can emerge from the surface of the cradle body that is between the cradle grooves by a pivoting action. When the portable terminal is cradled, the support plate is emerged from the surface of the cradle body for supporting a major surface (one of the rear or front surfaces) of the portable terminal having a display unit thereon, and a selected one of the cradle grooves supports an edge portion of the portable terminal.

The cradle further includes a keyboard installed on a side of a first cradle groove of the cradle grooves on the surface of the cradle body, wherein the support plate is pivotably installed on the other side of the first cradle groove.

A pivot axis of the support plate is positioned adjacent to the first cradle groove, and when the edge portion of the portable terminal is supported in the first cradle groove, the support plate faces one of the rear or front surfaces of the portable terminal.

A pivot axis of the support plate is positioned adjacent to the first cradle groove, and when the portion of the edge of the portable terminal is supported in a second cradle groove of the cradle grooves, an end portion of the support plate supports the other of the rear or front surfaces of the portable terminal.

The cradle further includes a second support plate which can emerge from the surface of the cradle body between the cradle grooves by pivoting action, wherein a pivot axis of the support plate is positioned adjacent to a first cradle groove of the cradle grooves and a second pivot axis, which is a pivot center of the second support plate, is positioned adjacent to a second cradle groove of the cradle grooves.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION

Figure 1:
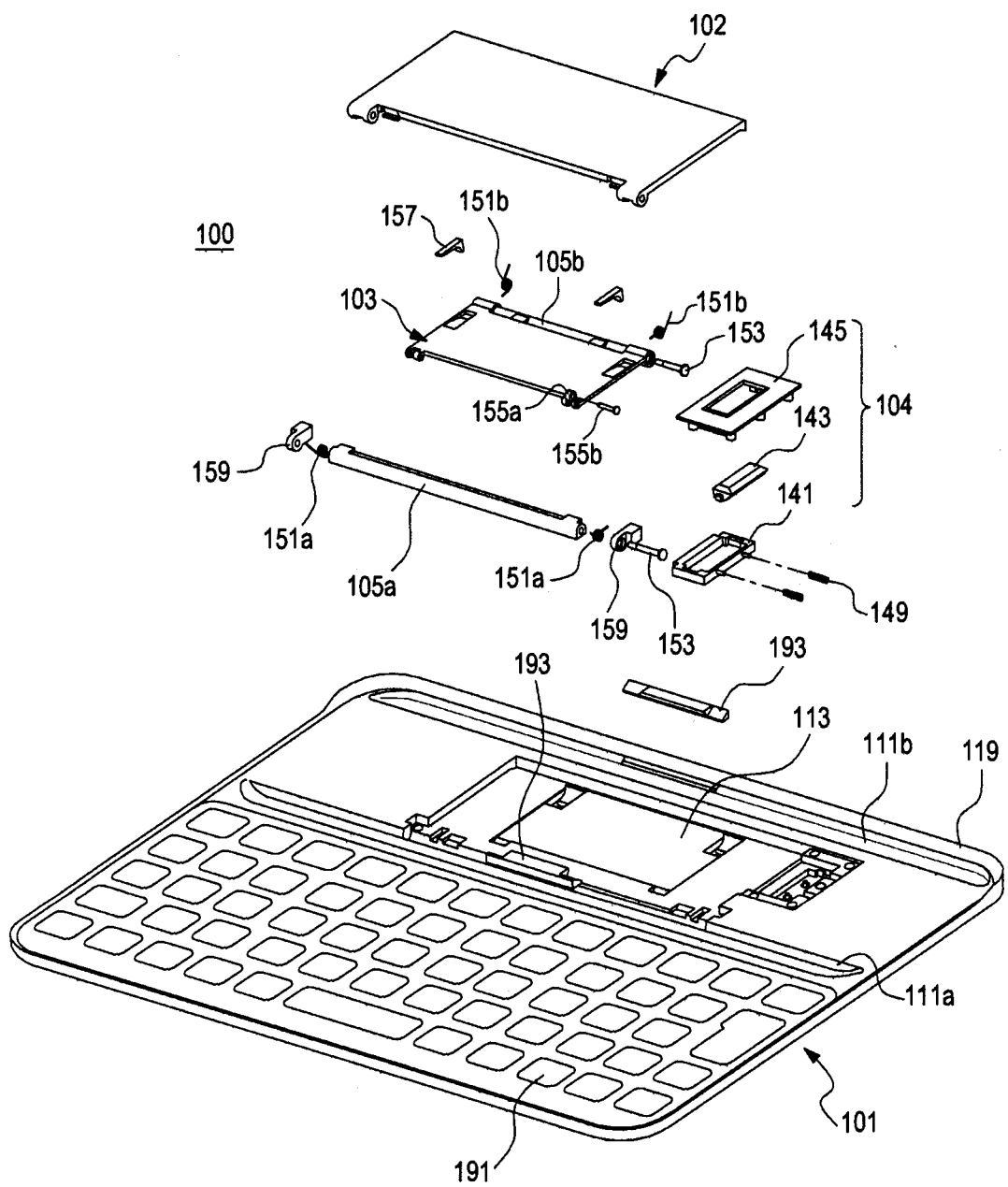
FIG. 1 is an exploded perspective view illustrating a cradle of a portable terminal according to an embodiment of the present invention.

Hereinafter, an exemplary embodiment of the present invention will be described in detail with reference to the accompanying drawings. For the purposes of clarity and simplicity, the detailed descriptions of functions and configurations incorporated herein that are well known to those skilled in the art will be omitted to avoid unnecessarily obscuring the present invention. Throughout the drawings, like reference numerals will be understood to refer to like parts, components and structures.

Figure 2:
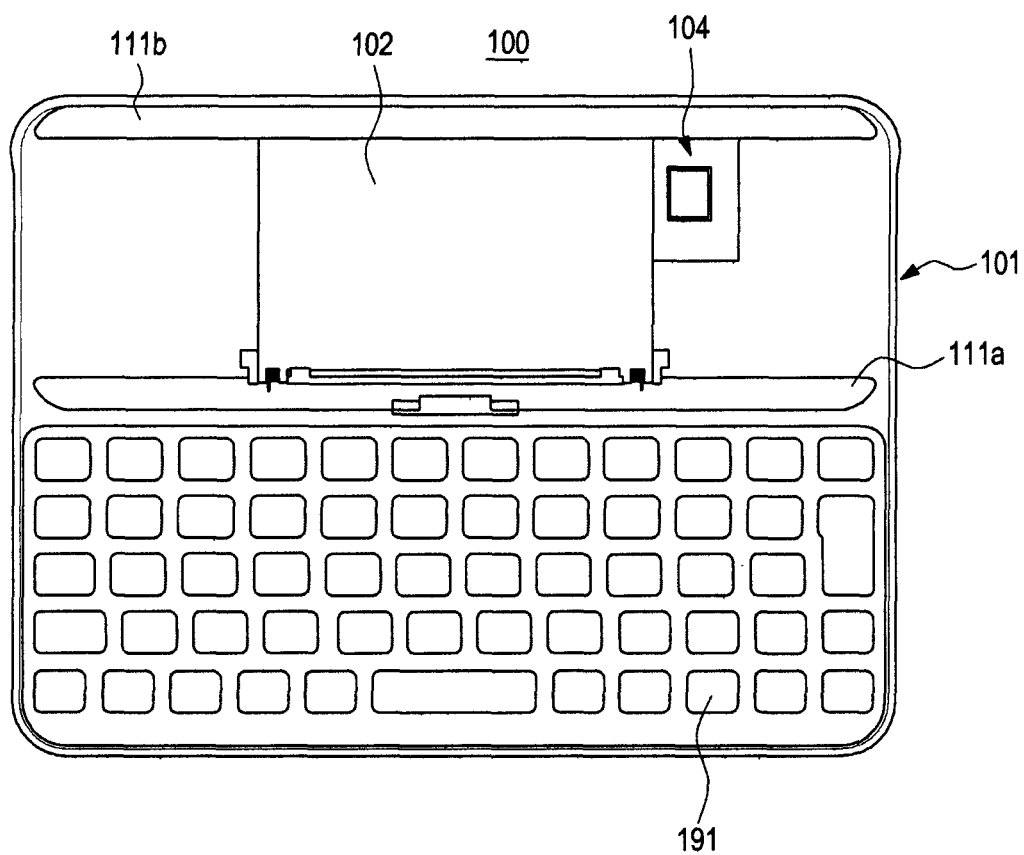
FIG. 2 is a plane view illustrating the cradle shown in FIG. 1.
Figure 3:
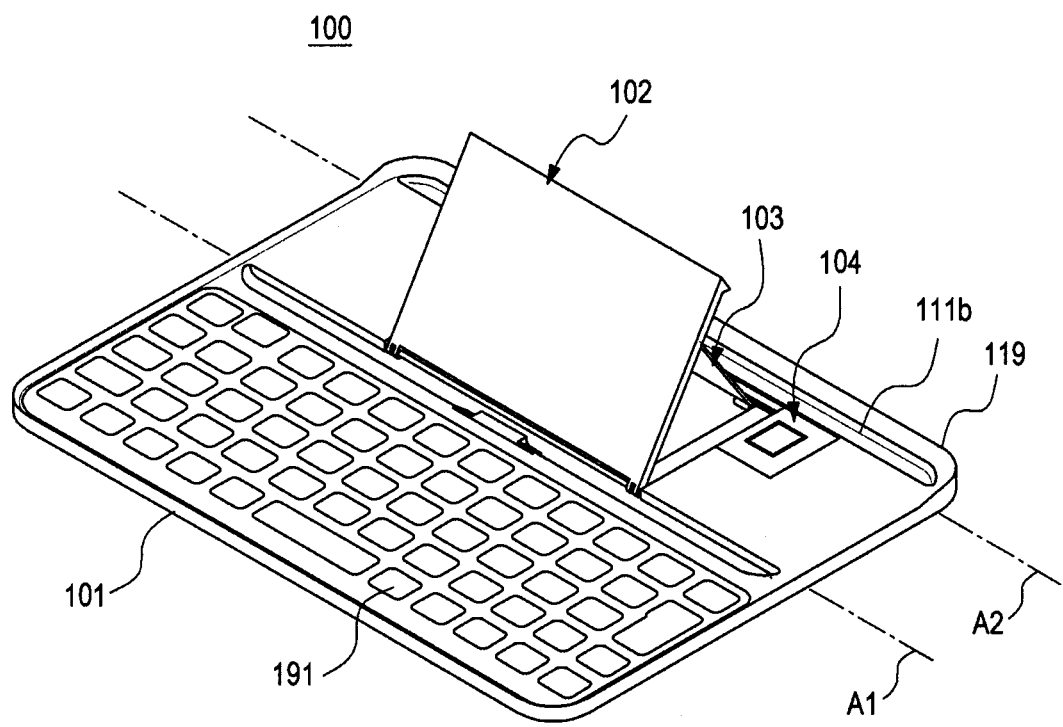
FIG. 3 is a perspective view illustrating a support plate of the cradle shown in FIG. 2, in an operating/protruding position.

As shown in FIGS. 1 through 3, a cradle 100 of a portable terminal according to an embodiment of the present invention includes a cradle body 101 having a pair of cradle grooves 111a and 111b on a surface thereof and a support plate 102 which is installed between the cradle grooves 111a and 111b to emerge from the surface of the cradle body 101. As will be described in detail with reference to FIGS. 14 through 17, a portable terminal 106 is supported by the support plate 102 and also by one of the cradle grooves 111a and 111b on a surface thereof.

As mentioned previously, the cradle body 101 includes the pair of cradle grooves 111a and 111b. The cradle grooves 111a and 111b extend in parallel with each other at spaced positions, and a keyboard 191 may be installed on a first side of a first cradle groove 111a of the cradle grooves 111a and 111b. On the first side of the first cradle groove 111a may also be installed a speaker phone. When the keyboard 191 is installed on the first side of the first cradle groove 111a, the cradle 100 may be used to extend an input device of a portable terminal such as a tablet PC. When the speaker phone is installed on the side of the first cradle groove 111a, the portable terminal may be mounted on the cradle 100 to be used as audio equipment.

Figure 13:
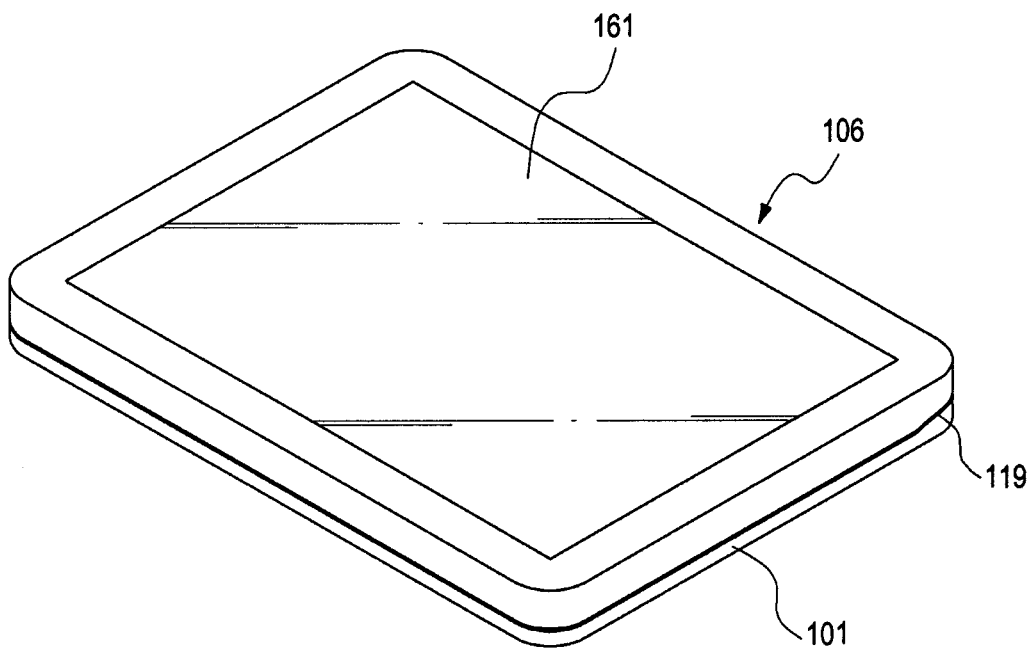
FIG. 13 is a perspective view illustrating a portable terminal which is coupled to the cradle shown in FIG. 1 while facing the cradle.

Along a circumference of an edge of a side of the cradle body 101, more specifically, an edge where a second cradle groove 111b of the cradle grooves 111a and 111b may be formed, a protection rib 119 protrudes from a surface of the cradle body 101. As shown in FIG. 13, a surface of the portable terminal 106 (such as the rear surface) may be coupled with the cradle 100 while facing the cradle 100, and in this case, the protection rib 119 may provide a means for securing the cradle body 101 to the portable terminal 106. That is, the protection rib 119 may include a separate binding protrusion like in a typical portable protection case, and is coupled to the rear surface of the portable terminal 106 through a magnetic interaction.

When the cradle 100 is coupled to the portable terminal 106 while facing the rear surface of the portable terminal 106, the overall thickness of the combination slightly increases; however, the cradle 100 and the portable terminal 106 are easy to carry because they form a single body. Therefore, the user, when desiring to carry the cradle 100, may conveniently carry the cradle 100 by coupling the cradle 100 with the portable terminal 106. The user, if not needing the cradle 100, may carry only the portable terminal 106. In this way, the user may conveniently move by carrying only the portable terminal 106 to use contents stored in the portable terminal 106 or a simple Internet search function, and may conveniently carry the cradle 100 and the portable terminal 106 by coupling the cradle 100 with rear of the portable terminal 106 if the user while on the move needs to conduct business or extend an input device by using the portable terminal 106.

Figure 4:
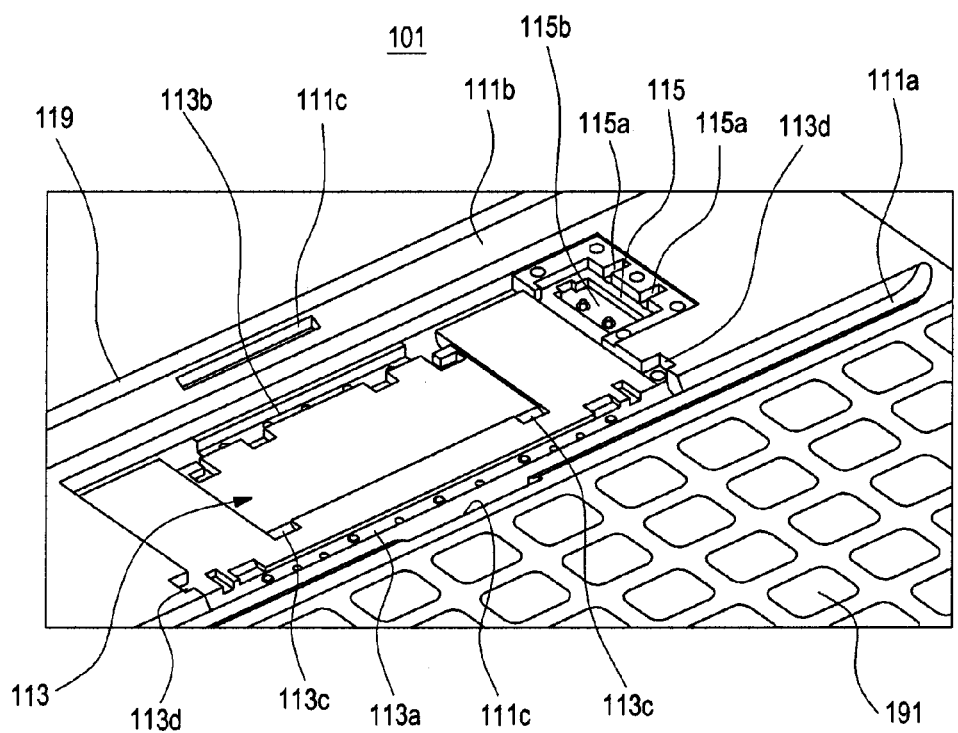
FIG. 4 is a perspective view illustrating in an enlarged manner main components of a cradle body of a cradle shown in FIG. 1.

On a surface of the cradle body 101 is formed a receiving recess 113 capable of receiving the support plate 102 or the like. Referring to FIG. 4, the receiving recess 113 is positioned between the cradle grooves 111a and 111b, and includes bracket grooves 113a and 113b and bearing receiving grooves 113c therein. At both sides of the receiving recess 113 may be provided grooves 113d for installing a lock device portion 104 and auxiliary brackets 159. While the lock device portion 104 is formed only at a side of the support plate 102, in a detailed embodiment of the present invention, it may also be installed at both sides of the support plate 102. The receiving recess 113 and various grooves formed therein and therearound are used to install the support plate 102 and provide a space for receiving the support plate 102 when the support plate 102 closely contacts and is in a substantially parallel relationship with a top surface of the cradle body 101. On the top surface of the cradle body 101, a fixing groove 111c is formed in each of the cradle grooves 111a and 111b to provide a space for installing support members 193 to be described below.

Figure 6:
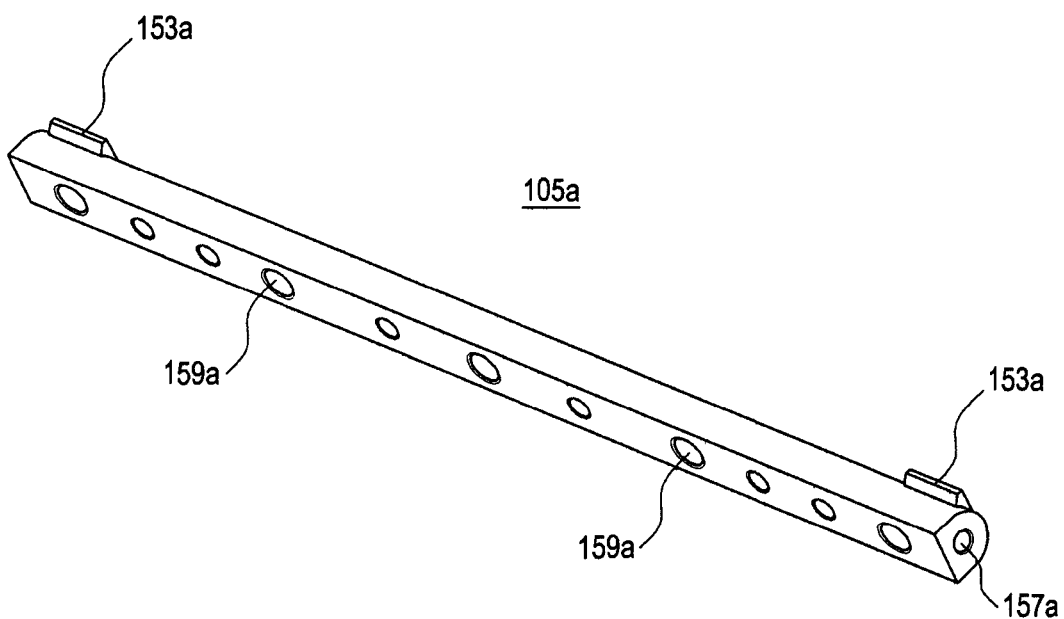
FIG. 6 is a perspective view illustrating a first bracket of the cradle shown in FIG. 1.
Figure 7:
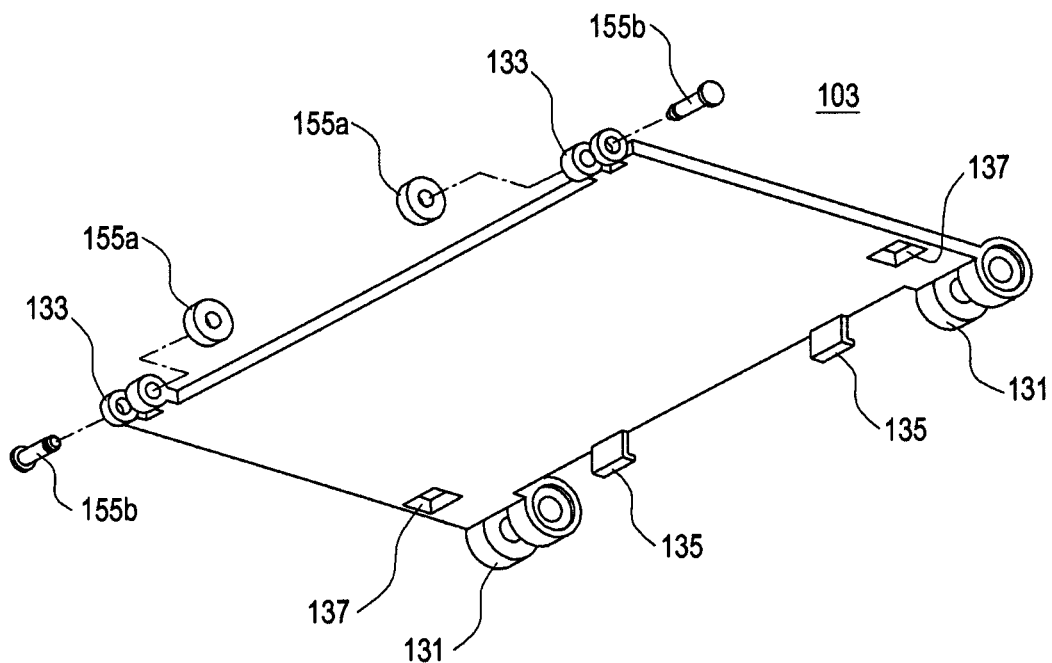
FIG. 7 is a perspective view illustrating a second support plate of the cradle shown in FIG. 1.

An end portion of a side of the support plate 102 is pivotably coupled to the surface of the cradle body 101, such that the support plate 102 is operable to emerge from the surface of the cradle body 101. To couple the support plate 102 to the cradle body 101 in a pivotable manner, the cradle 100 includes a first bracket 105a, pivot pins 153, and the auxiliary brackets 159. Referring to FIG. 6, the first bracket 105a extends in a direction, and includes engaging holes 159a formed on a bottom surface thereof and pivot holes 157a formed at both ends thereof. On an outer circumferential surface of the first bracket 105a are formed at least one, preferably a pair of first interfering protrusions 153a.

The first bracket 105a is mounted in one of the bracket grooves 113a formed in the receiving recess 113, and at this time, a screw (not shown) is coupled through the engaging hole 159a such that the first bracket 105a is fixed to the cradle body 101. Each of the auxiliary brackets 159 are fixed to one of the grooves 113d formed at both sides of the receiving recess 113. The auxiliary brackets 159 include through-holes formed to face the pivot holes 157a, and the respective pivot pins 153 are engaged with the pivot holes 157a at both ends of the first bracket 105a by passing through the auxiliary bracket 159.

Figure 5:
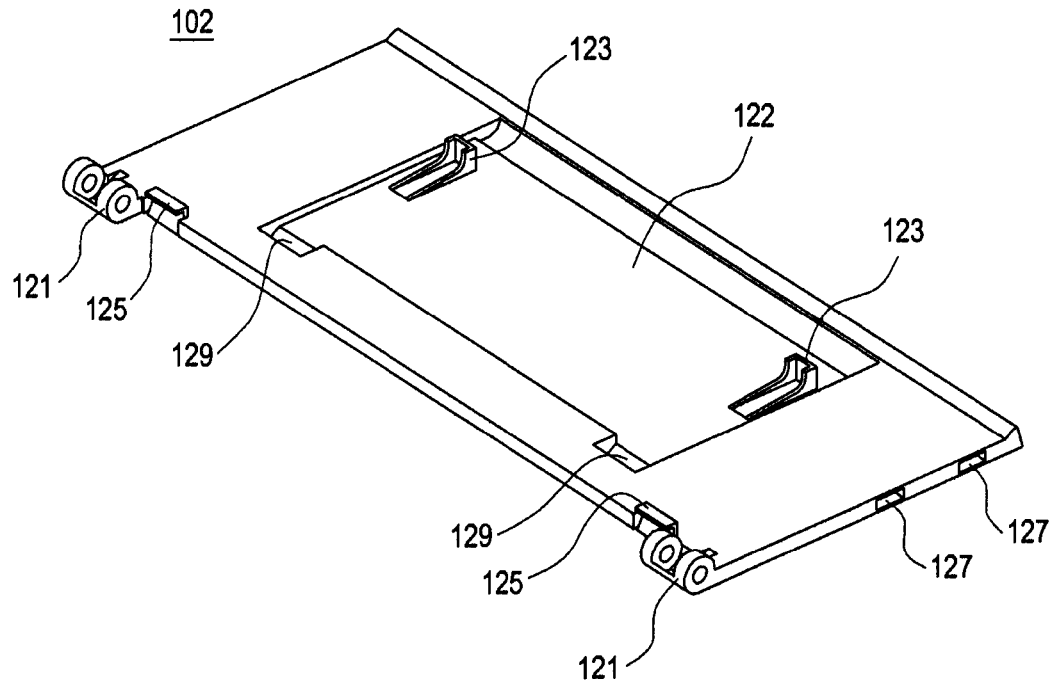
FIG. 5 is a perspective view illustrating details of the support plate of the cradle shown in FIG. 1.

Referring to FIG. 5, a pair of binding members 121 is formed at an end of the support plate 102, and the binding members 121 are bound to the pivot pins 153 provided at both ends of the first bracket 105a to pivotably couple the support plate 102 to the first bracket 105a. In this way, by coupling the binding members 121 to the first bracket 105a by means of the pivot pins 153, a first pivot axis A1 (shown in FIG. 3) is formed at a position adjacent to the first cradle groove 111a, and the support plate 102 pivots around the first pivot axis A1. In other words, a portion of the support plate 102 is coupled to one of the pivot pins 153 such that the support plate 102 pivots around the first pivot axis A1 while being supported by the pivot pins 153.

As shown in FIG. 1, the cradle 100 includes the lock device portion 104 and first elastic members 151a, thus maintaining the support plate 102 in a closed position, where it is in close contact, and in fact a substantially parallel relationship with the top surface of the cradle body 101. When a lock state is released, the support plate 102 pivots so as to emerge from the surface of the cradle body 101. Each of the first elastic members 151a includes a coil and free ends extending from both ends of the coil, in which one of the free ends is supported on the cradle body 101 and the other is supported on the support plate 102. The first elastic members 151a are installed such that the coil covers the outer circumferential surface of the pivot pin 153, and they are disposed at both ends of the first bracket 105a, respectively.

As shown in FIGS. 1 and 4, the lock device portion 104 is received in a lock device portion recess 115 formed at a side of the receiving recess 113, and includes lock grooves 127 formed at least a side surface of the support plate 102. In the lock device portion recess 115 are received a lock member 141 and coil springs 149. An end of each coil spring 149 is supported on an inner wall of the lock device portion recess 115 and the other end thereof is supported by the lock member 141 to provide an elastic force. To receive the coil springs 149, spring grooves 115a may be formed in the lock device portion recess 115. An end of each coil spring 149 is received in one of the spring grooves 115a. The lock member 141 is installed to linearly reciprocate in the lock device portion recess 115 by being provided with the elastic force of the coil springs 149.

Figure 10:
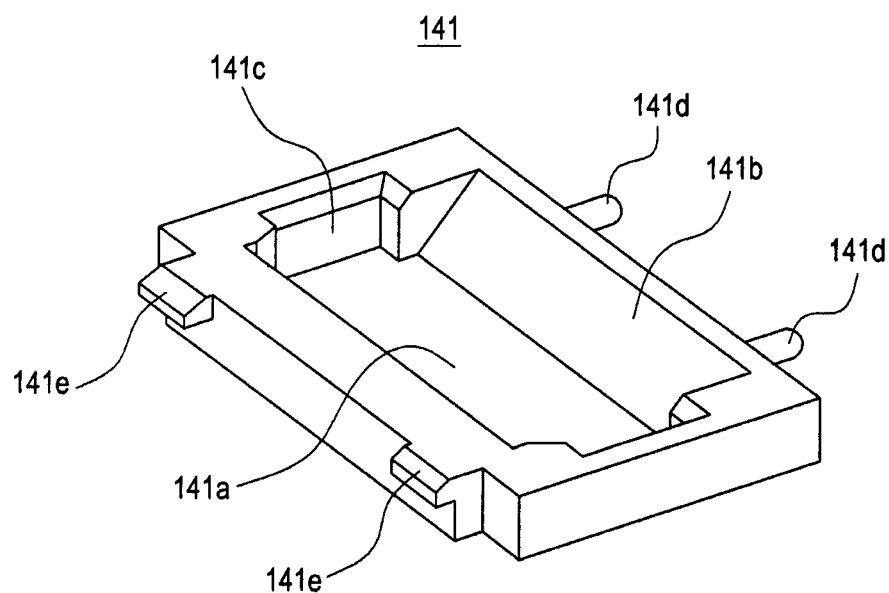
FIG. 10 is a perspective view illustrating a lock member of the cradle shown in FIG. 1.

Referring to FIG. 10, lock protrusions 141e are formed on a surface of the lock member 141 such that they are engaged with the lock grooves 127, respectively, by being provided with the elastic force of the coil springs 149 when the support plate 102 is received in the receiving recess 113. As mentioned previously, the lock device portion 104 is preferably installed at both sides of the receiving recess 113. On the lock member 141 may be formed second spring protrusions 141d extending in opposite directions to the lock protrusions 141e. Each coil spring 149 is disposed such that the other end thereof covers the outer circumferential surface of each second spring protrusion 141d. In this way, the coil springs 149 pressurize the lock member 141 to urge the lock protrusions 141e to be engaged with the lock grooves 127, respectively.

The lock member 141 is received in the receiving recess 113, and the user may linearly move the lock member 141 in a sliding manner to make the lock protrusions 141e leave the lock grooves 127. However, the lock member 141 is linearly moved by a pressing action in a detailed embodiment of the present invention, but the lock member 141 may be linearly moved in various ways.

Figure 11:
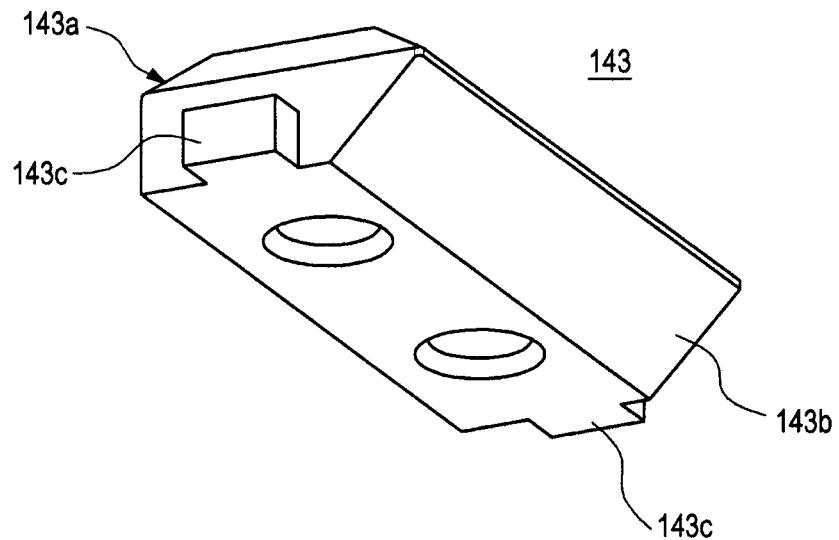
FIG. 11 is a perspective view illustrating an operation member of the cradle shown in FIG. 1.
Figure 12:
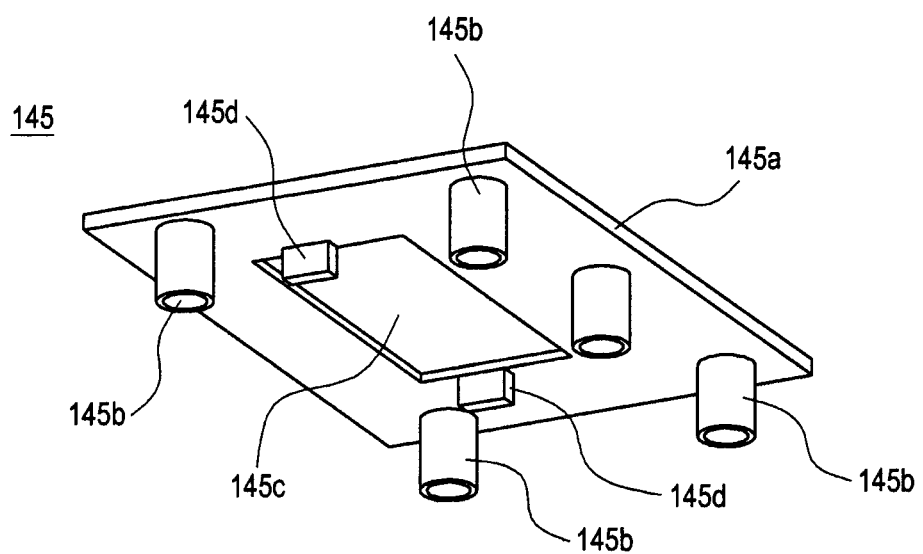
FIG. 12 is a perspective view illustrating a lock device cover of the cradle shown in FIG. 1.

Referring to FIGS. 1, 11, and 12, an operating member 143 is installed in the lock device portion recess 115 on the surface of the cradle body 101 to linearly reciprocate in perpendicular to the surface of the cradle body 101. In this state, an operating recess 115b (shown in FIG. 4) is formed on a bottom surface of the lock device portion recess 115 to secure a space allowing the linear movement of the operating member 143. In addition, the lock device cover 145 is coupled on the lock device portion recess 115, thus hiding the lock member 141, the coil springs 149, and so forth. In the lock device cover 145 is formed an operating hole 145c perforating a cover body 145a in the shape of a flat panel. The operating hole 145c receives the operating member 143, and guides the operating member 143 such that the operating member 143 can linearly move only in a perpendicular direction in relation to the surface of the cradle body 101. A portion of the operating member 143 is exposed from an outer side of the lock device cover 145 through the operating hole 145c.

A receiving groove 141a where a first inclined surface 141b is formed is formed in the lock member 141, and a second inclined surface 143b corresponding to the first inclined surface 141b is formed on an outer wall of a side of a body 143a of the operating member 143. The first and second inclined surfaces 141b and 143b are formed inclinedly along the linear movement of the lock member 141. Guide protrusions 143c are formed on both outer opposite side surfaces of the operating member 143, and guide grooves 141c are formed in inner opposite walls of the receiving groove 141a. The guide protrusions 143c are received in one of the guide grooves 141c to guide movement of the operating member 143 in the receiving groove 141a.

The lock device cover 145 includes stopper protrusions 145d formed on an inner surface of the cover body 145a near the operating hole 145c. The stopper protrusions 145d are positioned in the guide grooves 141c to interfere with the guide protrusions 143c. Thus, the operating member 143 limits a range in which the operating member 143 moves away from the cradle body 101. A plurality of bosses 145b are formed on the inner surface of the cover body 145a of the lock device cover 145 to be received in holes formed near the lock device portion recess 115. An engagement device, such as a screw, is engaged with each of the bosses 145b to fix the lock device cover 145 to the cradle body 101.

Due to the operating hole 145c, the operating member 143 can move only in a perpendicular direction in relation to the surface of the cradle body 101 and the lock member 141 can move only in parallel with the surface of the cradle body 101. Therefore, to secure a movement range of the lock member 141 with respect to the operating member 143, the guide grooves 141c have to be formed sufficiently larger than the widths of the guide protrusions 143c. For example, if the linear reciprocating range of the lock member 141 is 2 mm, the guide groove 141c should have a width larger than the guide protrusion 143c by at least 2 mm.

When the operating member 143 is disposed in the receiving groove 141a, the coil springs 149 pressurize the lock member 141 in a direction urging the first inclined surface 141b to closely contact the second inclined surface 143b. As a result, the operating member 143 moves away from the surface of the cradle body 101, thus protruding from the outer side of the lock device cover 145 to the maximum. As mentioned previously, the stopper protrusions 145d are interfered by the guide protrusions 143c, thus limiting a height by which the operating member 143 protrudes from the outer side of the lock device cover 145.

When the operating member 143 protrudes from the outer side of the lock device cover 145 to the maximum, the lock member 141 is at a position where the lock member 141 moves to the maximum toward the receiving recess 113 by means of the coil springs 149 and in this state, the lock protrusions 141e are positioned in the receiving recess 113 to be engaged with the lock grooves 127. At this time, when the support plate 102 enters the receiving recess 113, the support plate 102 pushes the lock protrusions 141e to move back the lock member 141. By forming inclined surfaces on the lock protrusions 141e, respectively, the inclined surfaces of the lock protrusions 141e are interfered by the support plate 102 when the support plate 102 is entering the receiving recess 113, such that the lock member 141 moves back and thus the support plate 102 can smoothly enter the receiving recess 113.

In this way, in a carry mode, the support plate 102 can keep being received in the receiving recess 113 by means of the lock device portion 104. When the user manipulates the operating member 143 of the lock device portion 104 to release a lock state, the first elastic member 151a urges the support plate 102 to protrude from the surface of the cradle body 101. When the support plate 102 protrudes from the surface of the cradle body 101, the portable terminal 106 is cradled such that the surface of the portable terminal 106 is supported facing the support plate 102 or is supported by an end portion of a side of the support plate 102. In addition, an edge of a side of the portable terminal 106 is supported by one of the first and second cradle grooves 111a and 111b.

Figure 9:
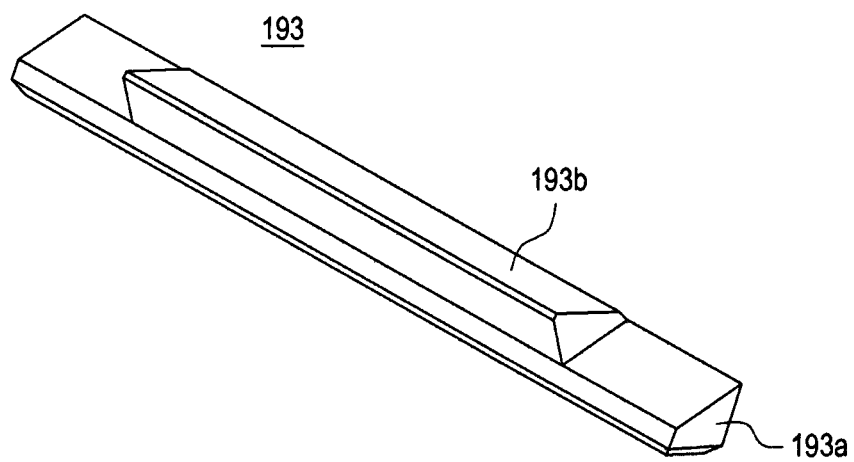
FIG. 9 is a perspective view illustrating a support member of the cradle shown in FIG. 1.

The support members 193 are fixed to the fixing grooves 111c formed in the first and second cradle grooves 111a and 111b, respectively, and as shown in FIG. 9, each support member 193 includes a fixing body 193a fixed to the fixing groove 111c and a support rib 193b formed on an outer circumferential surface of the fixing body 193a. When an edge of the portable terminal 106 is supported by one of the first and second cradle grooves 111a and 111b, the support ribs 193b support the edge of the portable terminal 106. Each of the support members 193 is formed of an elastic material such as urethane or silicon, thus suppressing generation of a shock or noise when the portable terminal 106 is cradled. Although a single support member 193 is mounted in each of the first cradle groove 111a and the second cradle groove 111b, respectively, in a further embodiment of the present invention, a plurality of support members may be mounted in the first cradle groove 111a and the second cradle groove 111b. The support member 193 is manufactured such that the length thereof is close to the lengths of the first and second cradle grooves 111a and 111b, thereby supporting the entire edge of the portable terminal 106 supported in the first and second cradle grooves 111a and 111b.

To limit the range of an angle by which the support plate 102 pivots from the cradle body 101, the cradle 100 may include first and second interfering protrusions 153a and 125. As mentioned previously, at least a pair of first interfering protrusions 153a are formed on the outer circumferential surface of the first bracket 105a, and the second interfering protrusions 125 corresponding to the number of first interfering protrusions 153a are formed at a side end of the support plate 102, more specifically, at an edge of the support plate 102 between the binding members 121. Once the support plate 102 pivots, the second interfering protrusions 125 turn around the first bracket 105a, thus interfering with the first interfering protrusions 153a. Thus, the pivot angle range of the support plate 102 can be set according to the positions where the first interfering protrusions 153a are formed.

The cradle 100 may further include a second support plate 103. The second support plate 103 supports the support plate 102, thereby preventing the support plate 102 from moving (pivoting) in a direction so that it again is closely contacting the cradle body 101 due to the weight of the portable terminal 106 acting upon the support plate 102 when the portable terminal 106 is cradled thereon.

Figure 8:
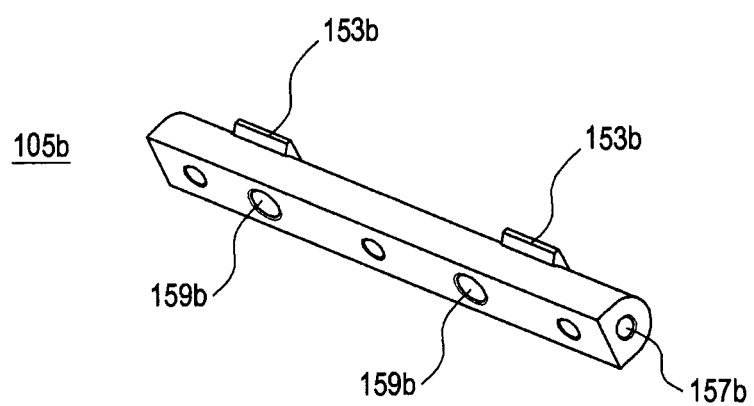
FIG. 8 is a perspective view illustrating a second bracket of the cradle shown in FIG. 1.

The second support plate 103 is pivotably coupled to the surface of the cradle body 101 through a second bracket 105b installed near the second cradle groove 111b. That is, a second pivot axis A2 providing a pivot center of the second support plate 103 is positioned in adjacent to the second cradle groove 111b. Referring to FIG. 8, like the first bracket 105a, the second bracket 105b includes engaging holes 159b formed on a bottom surface thereof and pivot holes 157b formed at both ends thereof. The second bracket 105b has substantially the same structure as the first bracket 105a, but a length thereof is different from that of the first bracket 105a. The second bracket 105b has third interfering protrusions 153b on an outer circumferential surface thereof. Second binding members 131 are formed on the second support plate 103, such that they are pivotably coupled to the second bracket 105b through the pivot pins 153 provided at both ends of the second bracket 105b. Moreover, fourth interfering protrusions 135 are formed on the second support plate 103 to limit the pivot angle range of the second support plate 103 together with the third interfering protrusions 153b. The second support plate 103 is also provided by a second elastic member 151b with an elastic force working in a direction urging the second support plate 103 to protrude (pivot) from the surface of the cradle body 101.

As such, the second support plate 103 is coupled with the cradle body 101 in a manner similar to the way that the support plate 102 is coupled to the cradle body 101, and thus a description of the coupling structure of the second support plate 103 will not be described herein. The auxiliary bracket 159 may be omitted when the support plate 102 or the second support plate 103 is installed. When the support plate 102 and the second support plate 103 closely contact the surface of the cradle body 101 (that is, when support plates 102 and 103 and the surface of the cradle body are all substantially in parallel planes in close juxtaposition to each other), the second support plate 103 is positioned between the support plate 102 and the surface of the cradle body 101.

To receive the second support plate 103 when closely contacting the surface of the cradle body 101, the support plate 102 may include an opening portion 122 (shown in FIG. 5) on a surface thereof, and first evasion grooves 129 and stopper members 157 on a surface of the opening portion 122. The first evasion grooves 129 are formed in the opening portion 122 and the stopper members 157 are positioned on the opening portion 122.

The first evasion grooves 129 are formed adjacent to an end portion of a side on the opening portion 122, and the stopper members 157 are positioned to be spaced apart from the first evasion grooves 129 on the opening portion 122. The stopper members 157 are formed of an elastic material such as urethane or silicon, and may be fixed to the opening portion 122 while being received in stopper guides 123 formed in the opening portion 122.

Second evasion grooves 137 are formed adjacent to the second binding members 131 on the second support plate 103, and bearing members 155a facing the second binding members 131 are installed at an edge of the second support plate 103. The bearing members 155a are coupled between rotation support pieces 133 formed at the edge of the second support plate 103 by means of mechanical elements such as E-rings (not shown). Once the support plate 102 and the second support plate 103 pivot, the bearing members 155a closely contact the surface of the support plate 102, thus rotating and moving. Therefore, when the support plate 102 and the second support plate 103 pivot with respect to each other, an end portion of a side of the second support plate 103 moves in parallel with the surface of the support plate 102.

When the support plate 102 and the second support plate 103 closely contact the cradle body 101, the bearing members 155a are received in the first evasion grooves 129 and the bearing receiving grooves 113c, and the stopper members 157 and the stopper guides 123 are received in the second evasion grooves 137. The lock protrusions 141e are engaged with the lock grooves 127, respectively, to confine the support plate 102 which is being received in the receiving recess 113.

As shown in FIG. 13, the cradle 100 may be coupled to the portable terminal 106 while facing a surface, such as a rear surface of the portable terminal 106, so that even when the cradle 100 is coupled with the portable terminal 106, a display device 161 of the portable terminal 106 may maintain an exposed state. Thus, the user can use the portable terminal 106 while conveniently carrying the portable terminal 106 by coupling the portable terminal 106 with the cradle 100.

When the portable terminal 106 is separated from the cradle 100, if the user presses the operating member 143, the lock member 141 moves back and the lock protrusions 141*e* leave the lock grooves 127. Once the lock protrusions 141*e* leave the lock grooves 127, the support plate 102 and the second support plate 103 are free to pivot as a result of the urging of the elastic members. In this state, the first elastic member 151*a* and the second elastic member 151*b* pivot the support plate 102 and the second support plate 103, respectively, such that the support plate 102 and the second support plate 103 protrude from the surface of the cradle 100 at a predetermined angle.

When the support plate 102 and the second support plate 103 protrude from the surface of the cradle body 101 by pivoting a predetermined angle, the first interfering protrusions 153*a* interfere with the second interfering protrusions 125 and the third interfering protrusions 153*b* interfere with the fourth interfering protrusions 135, respectively, thus stopping the pivoting movement of the support plate 102 and the second support plate 103. As mentioned previously, during the pivoting movement of the support plate 102 and the second support plate 103, the bearing members 155*a* rotate while contacting the surface of the support plate 102. Once the pivoting movement of the support plate 102 and the second support plate 103 due to interference between the interfering protrusions 153*a* and 125, and between the interfering protrusions 153*b* and the 135, the bearing members 155*a* are stopped at positions interfered by the stopper members 157. Thus, when the portable terminal 106 is supported by the support plate 102, the second support plate 103 supports the support plate 102, thereby preventing the support plate 102 from moving in a direction so that it will again pivot so as to be closely contacting the cradle body 101 due to the weight of the portable terminal 106.

Figure 14:
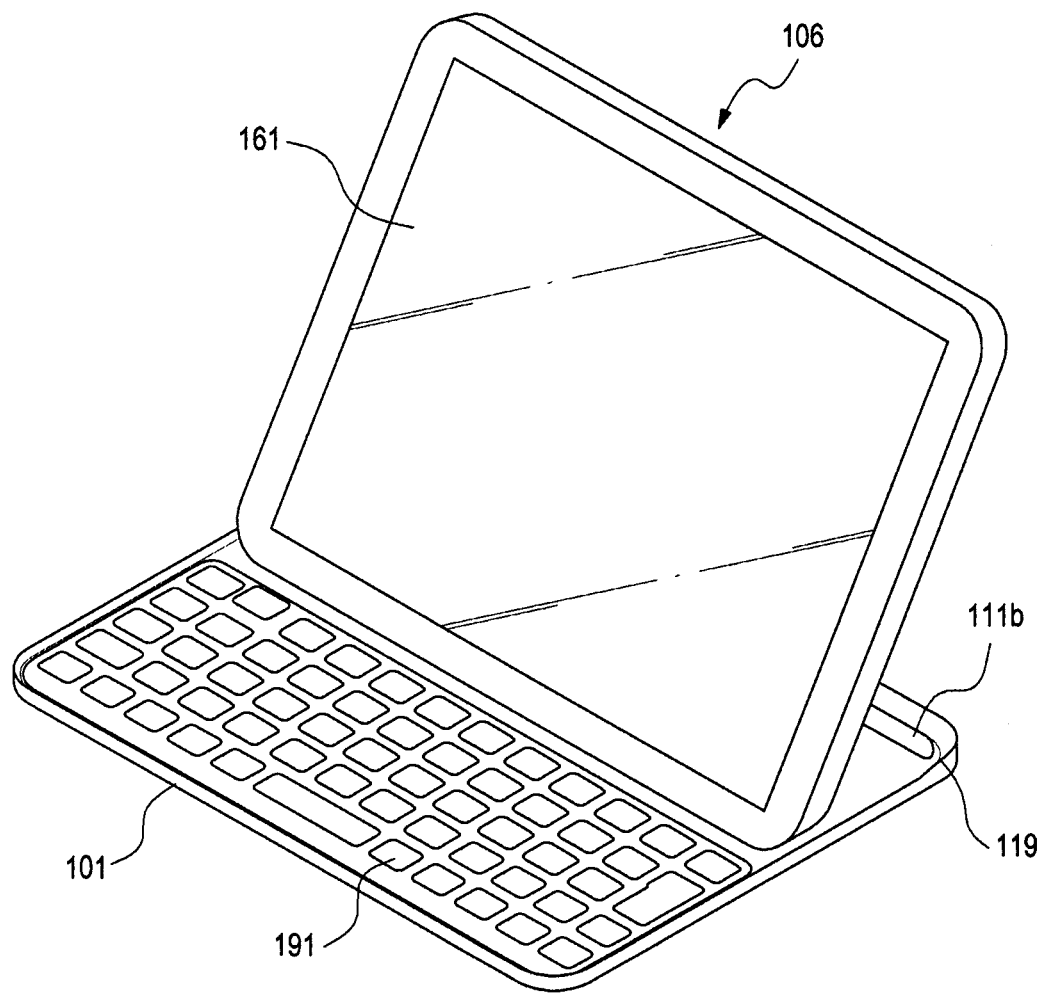
FIG. 14 is a perspective view showing that the portable terminal shown in FIG. 13 is coupled to a cradle while being supported by a first cradle groove.
Figure 15:
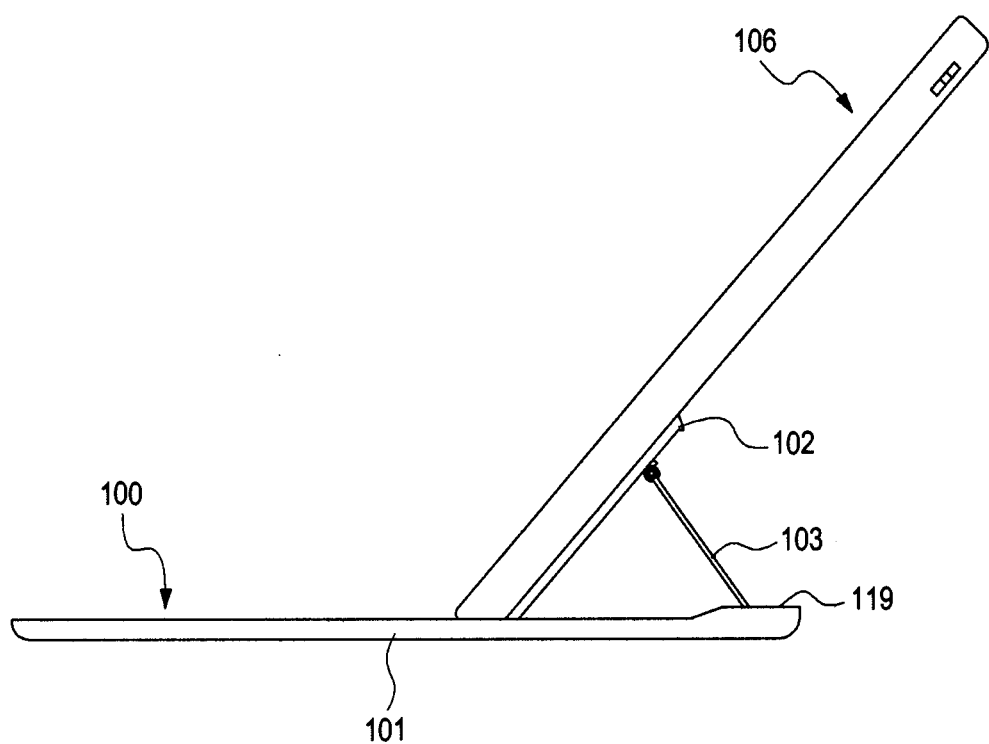
FIG. 15 is a side view of the portable terminal shown in FIG. 14.

FIGS. 14 and 15 show a state where the portable terminal 106 is cradled (held) on the cradle 100 while being supported along its rear surface by the support plate 102 and along an edge by the first cradle groove 111*a*, so that the display device 161 faces in the direction of the keyboard 191. The support plate 102 supports the portable terminal 106 while facing the rear surface of the portable terminal 106, and the keyboard 191 installed in the cradle body 101 is used as an input device of the portable terminal 106. The portable terminal 106 and the keyboard 191 may be connected through a separate cable or by using a short-range (or near field) wireless communication scheme such as Bluetooth communication. A separate connector may be disposed in the first cradle groove 111*a* to be connected with an interface connector provided in the portable terminal 106.

Figure 16:
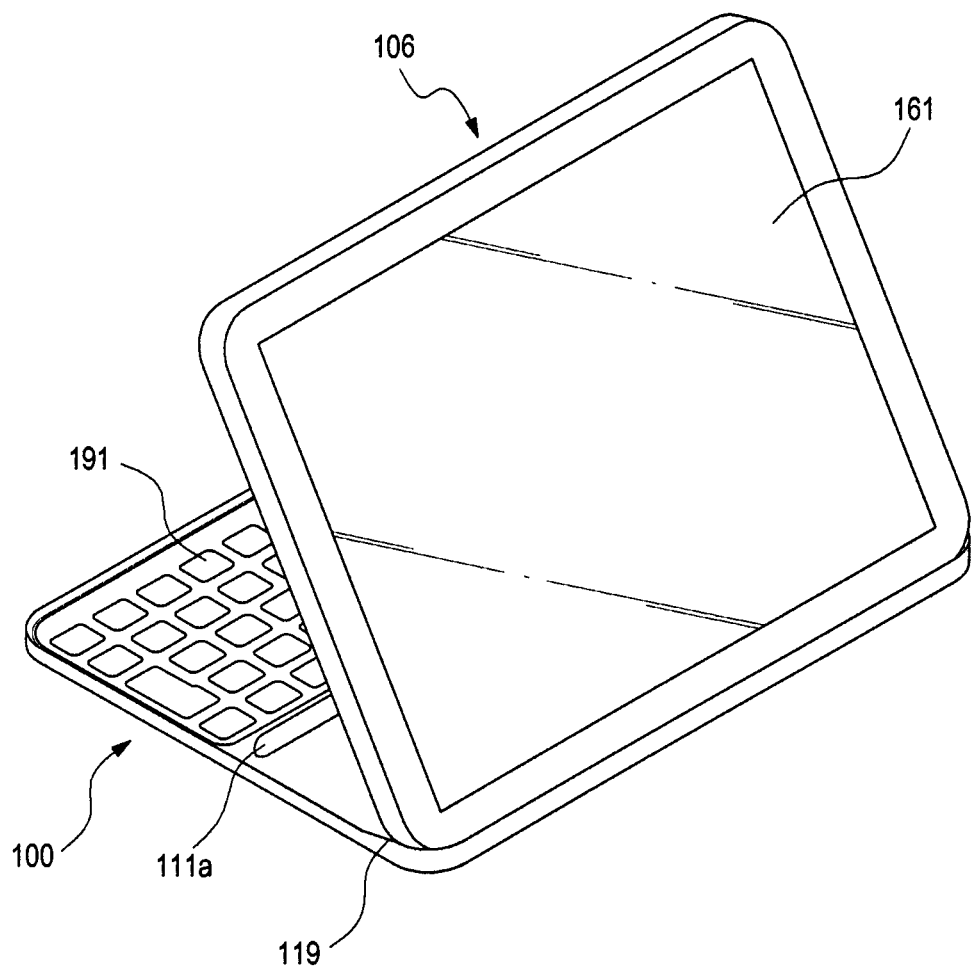
FIG. 16 is a perspective view showing that the portable terminal shown in FIG. 13 is coupled to the cradle while being supported by a second cradle groove.
Figure 17:
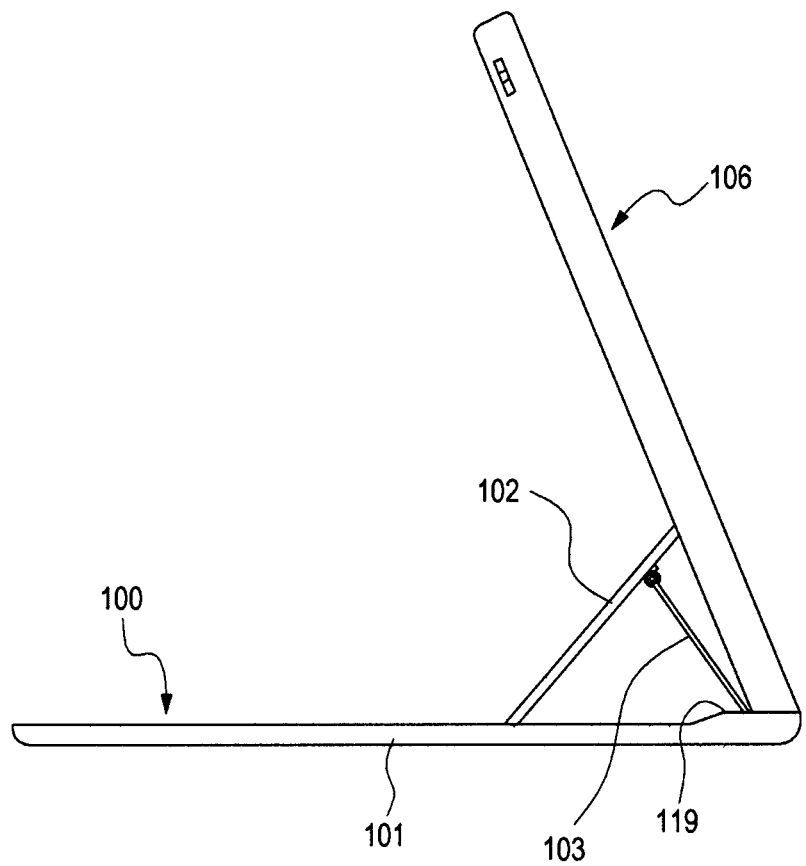
FIG. 17 is a side view of a portable terminal shown in FIG. 16.

FIGS. 16 and 17 show a state where the portable terminal 106 is cradled (held) on the cradle 100 while an edge of the portable terminal 106 is supported in the second cradle groove 111*b*, so that the display device 161 faces a direction that is opposite to the direction it faced when the edge portion of the portable terminal 106 was supported in the first cradle groove 111*a*. When the portable terminal 106 is cradled on the cradle 100 while an edge is supported in the second cradle groove 111*b*, an end portion of a side of the support plate 102 supports the rear surface of the portable terminal 106. In this position, the portable terminal 106 may execute a function which does not require many user manipulation actions, such as the playing of a video or a music file, video calling, video conferencing, or the like.

Thus, the cradle constructed and operating according to the present invention has between a pair of cradle grooves a support plate which can emerge from the surface of the cradle body, allowing the user to select a direction in which a display device of the portable terminal will face when the portable terminal is to be cradled. Therefore, the usage of the cradle can be diversified. Even furthermore, when the cradle is not in use, the cradle may be coupled to the portable terminal so as to cover a surface of the portable terminal, thereby improving safe portability of the portable terminal.

The cradle for the portable terminal described above is easy to carry because the support plate selectively emerges from the cradle body, and thus in a non-emerged position, the support plate lies substantially parallel with the plane of the cradle, thereby allowing the portable terminal to also lie parallel and in close proximity with the plane of the cradle. Moreover, when the cradle body is coupled to the rear side of the portable terminal, the user can select whether to carry only the portable terminal or to carry both the portable terminal and the cradle coupled to the rear side of the portable terminal, facilitating use and carrying of the cradle. Furthermore, when the keyboard is installed in the cradle body, the user can easily extend the input device of the portable terminal and couple the cradle to the rear side of the portable terminal, facilitating portability. In addition, even when the cradle has the keyboard installed therein, the support plate emerges between the pair of cradle grooves, thereby allowing the user to select a direction in which a display device of the portable terminal will face when the portable terminal is to be cradled.

While the invention has been shown and described with reference to an exemplary embodiment thereof, it will be understood by those skilled in the art that various changes in form and details may be made therein without departing from the scope of the invention as defined by the appended claims and their equivalents. For example, when the portable terminal 106 is not in use and is being transported, a surface, such as front surface of the portable terminal 106 which includes the display device 161 can be it can be coupled so as to face the cradle, thereby providing extra protection to the display device 161.

What is claimed is:

1. A cradle for a portable terminal, the cradle comprising: a cradle body; cradle grooves including at least a first cradle groove and a second cradle groove formed on a surface of the cradle body and extending parallel with one another; and a first support plate and a second support plate both mounted to the cradle body between the cradle grooves, the first support plate and the second support plate both configured to rise from the surface of the cradle body by a pivoting action along a first pivot axis and a second pivot axis, respectively, wherein: the first pivot axis of the first support plate is adjacent to the first cradle groove, and the second pivot axis is positioned adjacent to the second cradle groove of the cradle grooves, and when the portable terminal is coupled to the cradle body, the first support plate supports a major surface of the portable terminal, and an edge portion of the portable terminal is supported by at least one of the cradle grooves.

2. The cradle of claim 1, further comprising a keyboard installed adjacent to the first cradle groove, wherein the first cradle groove bisects the cradle body, and the first support plate is pivotably installed on an opposing side of the first cradle groove relative to the keyboard.

3. The cradle of claim 2, wherein when the edge portion of the portable terminal is supported in the first cradle groove, the first support plate is oriented towards the major surface of the portable terminal.

4. The cradle of claim 2, wherein when the edge portion of the portable terminal is supported in the second cradle groove of the cradle grooves, an end portion of the first support plate supports the major surface of the portable terminal.

5. The cradle of claim 1, further comprising a protection rib protruding from at least a portion of an edge of the surface of the cradle body, wherein
when the first support plate is in a closed configuration, the first support plate closely contacts the surface of the cradle body, allowing the portable terminal to be coupled to the cradle body such that the major surface of the portable terminal is oriented towards the surface of the cradle body, and the protection rib covers a portion of a side of the portable terminal.

6. The cradle of claim 1, wherein when an end of the second support plate is positioned on the second pivot axis, adjacent to the second cradle groove, and another end of the second support plate is positioned adjacent to a surface of the first support plate, the second support plate being pivotable simultaneously with the first support plate.

7. The cradle of claim 1, further comprising elastic members providing elastic tension configured to cause the first support plate and the second support plate to automatically rise from the surface of the cradle body.

8. The cradle of claim 1, further comprising a lock device portion for securing the first support plate when the first support plate and the second support plate are in a closed configured closely contacting the surface of the cradle body, wherein the lock device portion comprises:
lock grooves formed on at least a side of the first support plate;
a lock member installed on the surface of the cradle body and configured to linearly reciprocate;
lock protrusions formed on the lock member and selectively engagable with the lock grooves; and
coil springs for providing elastic tension causing the lock protrusions to engage with the lock grooves.

9. The cradle of claim 8, wherein the lock device portion further comprises:
a receiving recess in the lock member, the receiving recess comprising a first inclined surface on an inner wall of a side thereof; and
an operating member received in the receiving recess, the operating member comprising a second inclined surface corresponding to the first inclined surface on an outer wall of a side thereof,
wherein when the operating member moves in a direction perpendicular to linear movement of the lock member, the first inclined surface contacts the second inclined surface, causing the lock member to move such that the lock protrusions are decoupled from the lock grooves.

10. The cradle of claim 9, wherein the lock device portion further comprises:
guide grooves formed on opposing inner walls of the receiving recess; and
guide protrusions formed on outer sides of the operating member,
wherein the guide protrusions are received in the guide grooves, respectively, to guide the movement of the operating member in the receiving recess.

11. The cradle of claim 9, wherein the lock device portion further comprises:
a lock device cover coupled to the cradle body and configured to cover the lock member; and
an operating hole formed in the lock device cover exposing a portion of the operating member,
wherein the lock member moves linearly in the lock device cover.

12. The cradle of claim 1, further comprising:
a pair of brackets, each of which is disposed adjacent to one of the cradle grooves; and
pivot pins provided at both ends of each of the pair of brackets,
wherein the first support plate and the second support plate is each coupled to at least one of the pivot pins, the pivoting action thus being supported by the pivot pins.

13. The cradle of claim 12, further comprising:
first interfering protrusions formed on an outer circumferential surface of each of the brackets; and
second interfering protrusions formed on the first support plate and the second support plate,
wherein the first interfering protrusions and the second interfering protrusions interfere during the pivoting action to limiting pivot ranges of the first support plate and the second support plate.

14. The cradle of claim 1, further comprising: stopper members provided on the surface of the first support plate; and bearing members provided at an end of the second support plate, wherein as the first support plate and the second support plate pivot, the bearing members are moved while maintaining contact with the surface of the first support plate, the bearing members thus interfering with the stopper members to limit pivot ranges of the first support plate and the second support plate.

15. The cradle of claim 14, further comprising:
an opening portion formed on the surface of the first support plate; and
first evasion grooves formed on the opening portion,
wherein when the first support plate and the second support plate are in a closed configuration closely contacting the surface of the cradle body, the second support plate is disposed within the opening portion and the bearing members are disposed within the first evasion grooves.

16. The cradle of claim 14, further comprising:
stopper guides formed on the surface of the first support plate; and
second evasion grooves formed in the second support plate,
wherein the stopper members are secured when disposed within the stopper guides, and when the first support plate and the second support plate are in a closed configuration closely contacting the surface of the cradle body, the stopper members, together with the stopper guides, are disposed within the second evasion grooves.

17. The cradle of claim 1, further comprising:
at least one support members disposed in at least one of the cradle grooves,
wherein the at least one support members supports a portion of the edge of the portable terminal when the portable terminal is coupled to the cradle such that the edge is disposed within one of the cradle grooves.

* * * * *

UNITED STATES PATENT AND TRADEMARK OFFICE
CERTIFICATE OF CORRECTION

Page 1 of 1

PATENT NO. : 9,081,544 B2
APPLICATION NO. : 13/647613
DATED : July 14, 2015
INVENTOR(S) : Won-Tae Kim It is certified that error appears in the above-identified patent and that said Letters Patent is hereby corrected as shown below:

In the claims,

Column 12, Claim 13, Line 27 should read as follows:
--...action to limit pivot...--

Column 12, Claim 17, Line 58 should read as follows:
--...support member disposed in...--

Column 12, Claim 17, Line 60 should read as follows:
--...support member supports a...--

Signed and Sealed this
Twelfth Day of January, 2016

Michelle K. Lee
*Director of the United States Patent and Trademark Office*